Patented June 18, 1940

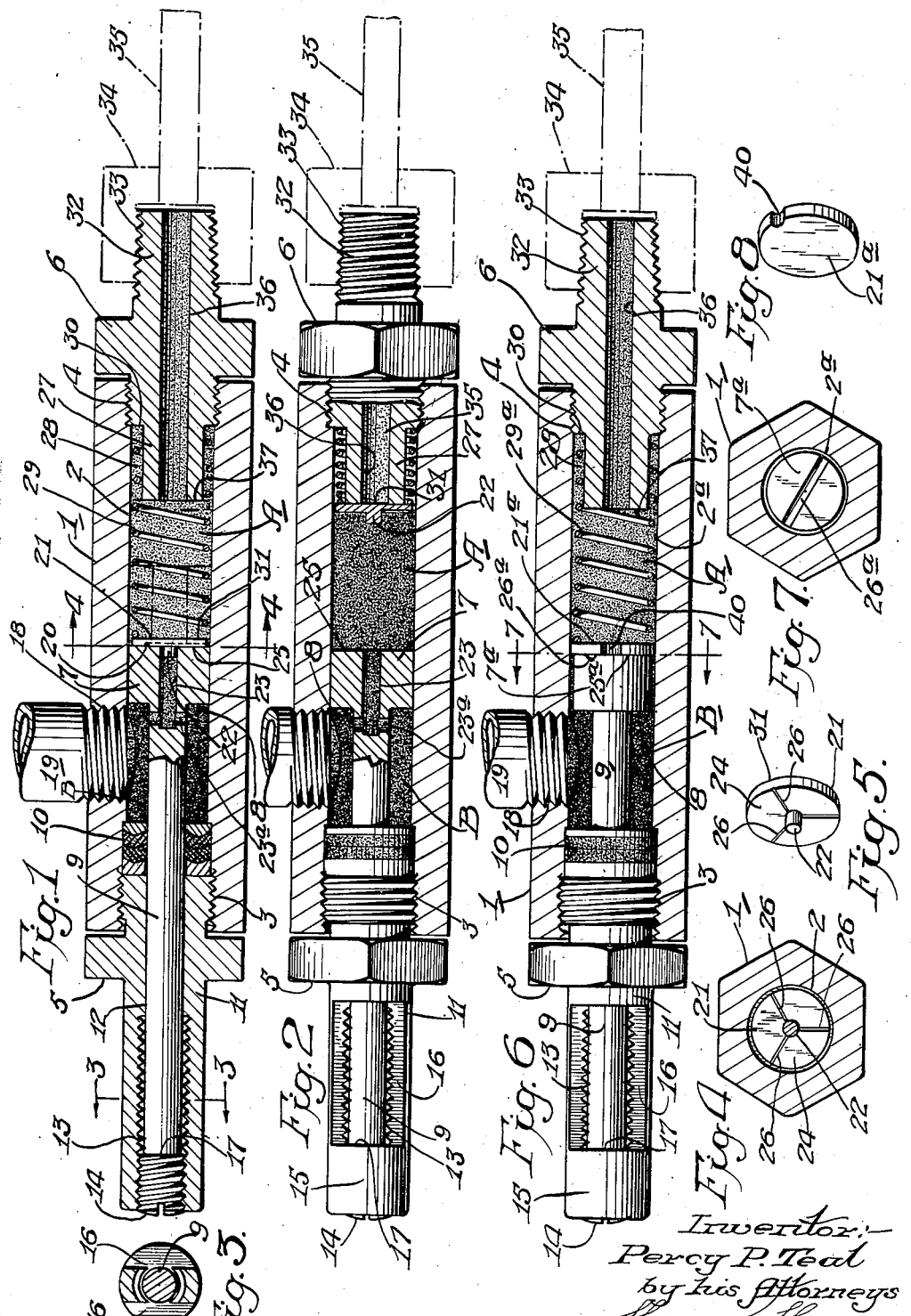

2,205,320

UNITED STATES PATENT OFFICE 2,205,320

MEASURING DEVICE FOR LUBRICATING SYSTEMS

Percy P. Teal, Norristown, Pa.

Application July 8, 1939, Serial No. 283,513

2 Claims. (Cl. 184—7)

This invention relates to pressure systems for lubricating moving parts of various mechanical appliances; and more particularly to a measuring device for use in such a system, between the source of supply of the lubricant and the appliance being lubricated, whereby a predetermined quantity of lubricant, either grease or oil, will be supplied to the mechanical appliance each time pressure is applied to the lubricant entering the measuring device, the application of pressure being controlled manually, whenever desired, or automatically at predetermined intervals by a suitable timing mechanism.

The object of the present invention is to provide a measuring device which will be actuated by the lubricant itself; the construction of the device being such that the pressure applied to the lubricant entering the device will force a measured charge of the lubricant from a measuring chamber in the device to the machine being lubricated, close the discharge port of the measuring chamber to prevent more than a single measured charge of lubricant being supplied to the machine at any one time, and refill the measuring chamber with the lubricant before the pressure under which the lubricant is entering the measuring device is relieved; and such, that, upon relief of the actuating pressure the measuring device will automatically reset itself to extrude another single charge of lubricant from the measuring chamber, through the discharge port thereof, when the actuating pressure is again applied to the lubricant entering the measuring device.

The principle upon which the measuring device operates involves the use of a reciprocable piston within a cylinder, a piston rod extending from the piston into the atmosphere outside the cylinder, through a stuffing box located at one end of the cylinder, a pressure feed inlet communicating with the interior of the cylinder, between the rear face of the piston from which the rod projects and the end of the cylinder in which the stuffing box is installed, a measuring chamber in the cylinder between the second or forward face of the piston and the second or discharge end of the cylinder, a sealing disc in the cylinder within the measuring chamber, and a compression spring for resiliently holding the disc normally against the forward face of the piston.

Assuming that the measuring chamber is already filled with lubricant, additional lubricant entering the cylinder under pressure, between the rear face of the piston and the stuffing box end of the cylinder, in the space around the piston rod, will force the piston forwardly toward the discharge port at the discharge end of the cylinder, until the charge of lubricant in the measuring chamber is completely expelled therefrom, whereupon the sealing disc, normally pressed against the forward face of the piston by the compression spring located within the measuring chamber, will close the discharge port and prevent further lubricant from passing therethrough, after which the lubricant in the cylinder between the rear face of the piston and the stuffing box, still being under pressure, by-passes the piston and forces its way between the forward face of the piston and the rear face of the sealing disc and moves the piston rearwardly to its starting position, leaving the sealing disc seated against and closing the discharge port, with the spring in a compressed state around a boss in the discharge end of the cylinder in which the discharge port is located. As the piston moves rearwardly, under the pressure of the lubricant entering between the sealing disc and the forward end of the piston, the lubricant in the receiving end of the cylinder, still under pressure, continues to by-pass the piston until the piston has returned completely to its starting position. As long as the lubricant entering the cylinder is maintained under pressure the sealing disc will remain in position blocking the passage of the lubricant through the discharge port against which the disc is seated. As soon as the pressure of the lubricant entering the cylinder is reduced to a point below the pressure of the spring compressed between the disc and the discharge end of the cylinder, the spring moves the disc away from the discharge port, rearwardly through the cylinder, until the disc assumes its normal position against the forward face of the piston, the lubricant in the measuring chamber by-passing the disc during such movement thereof. The device is then ready for another application of lubricant under pressure into the receiving end of the cylinder, between the rear face of the piston and the stuffing box.

The return movement of the piston to its starting position, under the same pressure which had moved the piston forwardly to expell a measured charge of lubricant from the measuring chamber, is effected as a result of the unbalanced or unequal state of the areas of the forward and rear faces respectively of the piston, the area of the rear face being smaller than that of the forward face to the extent of the cross-sectional area of the piston rod. Because of the fact that the outer end of the piston rod is subjected only to atmospheric pressure, while the forward and rear faces of the piston are subjected to the much higher pressure of the lubricant entering the cylinder, the difference in the areas of the two faces of the piston causes a greater force to be applied to the forward face than to the rear face, thus effecting the rearward movement of the piston to its starting position.

The construction of the measuring device forming the subject of the present invention will be more fully disclosed hereinafter, reference being had to the accompanying drawings, of which:

Fig. 1 is a longitudinal sectional view showing the elements in the relative positions occupied at the initial application of lubricant under pressure thereto;

Fig. 2 is a view similar to Fig. 1 with the elements in the relative positions assumed after a measured charge of lubricant has been expelled from the measuring chamber and before the pressure of the lubricant entering the device has been reduced;

Figure 9:
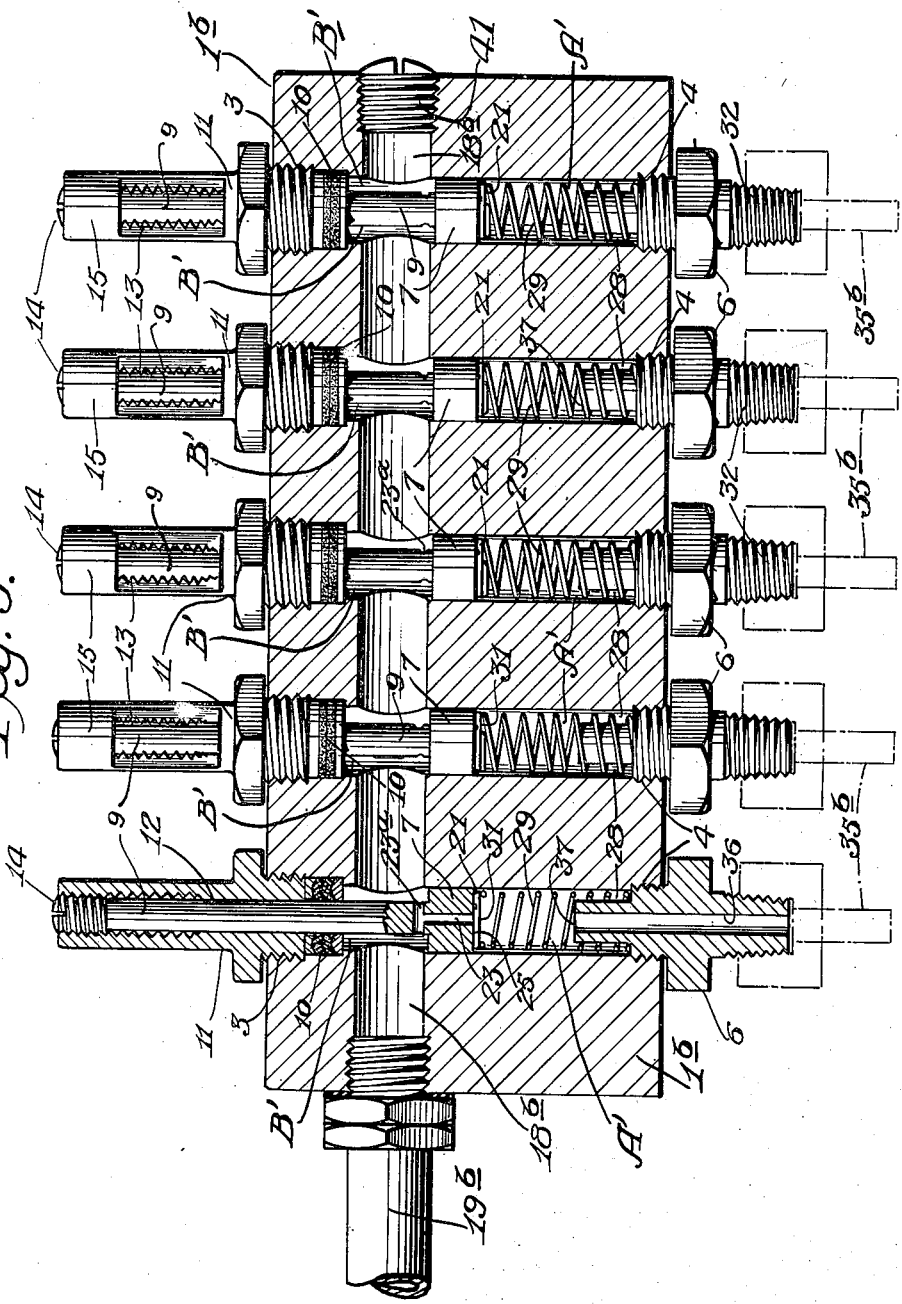

Figs. 3 and 4 are transverse sectional elevations taken on the lines 3—3 and 4—4 respectively on Fig. 1;

Fig. 5 is a perspective view of the sealing disc in the device disclosed in Figs. 1 and 2;

Fig. 6 is a view similar to Fig 1 showing a modification of the device within the scope of the invention;

Fig. 7 is a transverse section taken on the line 7—7, Fig. 6;

Fig. 8 is a perspective view of the sealing disc employed in the structure of Fig. 6; and Fig. 9 is a longitudinal sectional view of a multiple head structure within the scope of the invention.

As shown in Figs. 1 and 2, the device comprises a main body portion 1 having a longitudinal cylindrical bore 2 extending completely through the body 1 from end to end thereof, said bore being threaded at its opposite ends, as indicated at 3 and 4 respectively, for the reception of closure plugs 5 and 6 respectively. Reciprocably mounted in the bore 2 is a piston 7, from the rear face 8 of which extends a piston rod 9, a suitable packing gland 10 being provided around the piston rod adjacent the inner end of the plug 5.

The plug 5 is provided with an axial extension 11 and a bore 12 extending completely through said extension and said plug and providing a sliding bearing for the piston rod 9. The end of the bore 12 adjacent the outer end of the extension 11 is threaded, as indicated at 13, for the reception of a stop screw 14 which regulates the quantity of lubricant measured and expelled by the device, as will be fully disclosed hereinafter.

As shown in Figs. 1 and 2, one or both sides of the extension 11 is cut away for a suitable distance between the plug 5 and an outer cylindrical end 15 of said extension, as indicated at 16, down to the bore 12, whereby the outer end 17 of the piston rod 9 will be at all times in direct communication with the outside atmosphere. Obviously, any other suitable opening between the bore 12 and the outside of the extension 11 would suffice for the purpose.

Between the rear face 8 of the piston 7 and the packing gland 10, the body 1 is provided with an internally threaded lubricant inlet opening 18, which communicates with the bore 2 and is provided with a feed pipe 19. The feed pipe 19 is connected to a suitable source of supply of and pressure for lubricant, the pressure being supplied by pump, or other means capable of forcing the lubricant through the feed pipe 19 into the cylindrical bore 2 under desired pressure.

Seated against the forward face 20 of the piston 7 is a disc 21. The rear face of the disc 21 is provided with an axial protuberance 22 which is disposed within an axial opening 23 formed in and extending axially through the piston 7 and communicating with a transverse passage 23a formed in the piston rod 9 adjacent the rear face 8 of the piston 7. The rear face 24 of the disc 21, which normally bears against the forward face 25 of the piston 7, is also provided with one or more grooves 26 extending radially from the base of the protuberance 22, for purposes hereinafter described.

The plug 6 is provided with an axial extension 27 which extends into the bore 2 and is of lesser diameter than said bore to provide an annular recess 28 at the discharge end of the cylinder 2 for the reception of a spring 29. One end of the spring 29 is seated against the base 30 of the annular recess 28, while the second end of said spring is seated against the forward face 31 of the disc 21.

The plug 6 is provided with an outwardly extending axial projection 32 which is externally threaded, as indicated at 33, for direct application to a bearing or for the reception of a suitable nut for securing one end of a pipe or tube 35 to the device, the opposite end of said tube being suitably connected to the mechanical device being lubricated.

The plug 6 and its extensions 27 and 32 are provided with a common axial bore 36. An annular seat 37 is provided on the innermost end of the extension 27, around the corresponding end of the bore 36 which constitutes the discharge port for the measuring chamber A formed between the plug 4, or at least the seat 37, and the forward face 31 of the sealing disc 21 disposed against the forward face 25 of the piston 7.

Assuming that the tube 35, the bore or discharge port 36, and the measuring chamber A are filled with lubricant, under atmospheric pressure as shown by the light stipling in Fig. 1, and that lubricant under pressure in excess of atmospheric pressure, and which may run as high as 500 pounds per square inch or more if desired, is supplied through the pipe 19 to the inlet chamber B, within the cylinder 2, between the rear face 8 of the piston 7 and the packing gland 10, the pressurized lubricant will move the piston forwardly in the cylinder 2, from the full line position to the broken line position, shown in Fig. 1, until the forward face 31 of the sealing disc 21 is pressed firmly against and in sealing contact with the seat 37 around the discharge port 36. With the lubricant still under high pressure, and with the forward movement of the piston being arrested by reason of the disc 21 abutting against the seat 37, the pressurized lubricant in the piston by-pass passages 23, 23a exerts a force against the end of the axial protuberance 22 of the disc 21 to hold the disc 21 seated against the seat 37. At the same time the lubricant in the by-passes forces its way around the protuberance 22 into the radial grooves 26, in the rear face 24 of the disc 21, and between the rear face 24 of the disc 21 and the forward face 25 of the piston 7.

Due to the unbalanced areas of the faces 8 and 25 of the piston 7, as previously noted, the lubricant under high pressure forcing its way between the forward face 25 of the piston 7 and the rear face 24 of the sealing disc 21 moves the piston rearwardly, from the position shown in broken lines in Fig. 1 to the position shown in full lines in Fig. 2, leaving the disc 21 firmly pressed against the seat 37, under the pressure of the lubricant in the discharge chamber A, and with the spring 29 compressed within the annular recess 28, as shown in Fig. 2.

In moving rearwardly, the piston displaces the lubricant in the inlet chamber B, through the by-pass ducts 23, 23a, into the measuring chamber A, until the outer end 17 of the piston rod 9 abuts against the inner end of the quantity regulating screw 14.

As long as the lubricant in the pipe 19 remains under high pressure the sealing disc 21 will remain seated against the valve seat 37, around the discharge port 36, and prevent additional lubricant from being forced into the pipe 35. However, as soon as the pressure of the lubricant in the pipe 19 is reduced below the pressure exerted by the compressed spring 29, said spring will react to move the sealing disc 21 from its sealing position, shown in Fig. 2, to its normal position against the forward face of the piston, as shown in Fig. 1, the lubricant within the measuring chamber A at such time by-passing around the peripheral edge of the disc 21, due to the disc being of slightly smaller diameter than the cylinder bore 2. The device is reset, by such procedure, for a further application of pressure to the lubricant in the pipe 19 for a repeat of the cycle.

The quantity of lubricant forced into the pipe 35 upon each operation of the device may be accurately controlled by changing the position of the abutment screw 14 axially within the bore 12 in which the piston rod 9 operates.

The structure shown in Fig. 6 functions in a manner similar to that just described with respect to the structure shown in Figs. 1 and 2, the difference being that, in the structure of Fig. 6, the piston 7a is of slightly less diameter than the cylindrical bore 2a, instead of the piston being a snug movable fit as in Fig. 1, to permit the lubricant under pressure to by-pass the piston between the peripheral face of the piston and the wall of the cylinder 2, instead of through the ducts 23, 23a shown in Fig. 1.

In the structure shown in Fig. 6 the sealing disc 21a is a snug moving fit within the cylinder 2a and by-passing of the lubricant, when the disc moves under the influence of the spring 29a, is effected through a notch 40 formed in the peripheral face of the disc 21a, instead of the lubricant by-passing around the full peripheral edge of the disc, as in Fig. 1.

Furthermore, the lubricant under pressure finds its way between the sealing disc 21a and the forward end 25a of the piston through a transverse groove 26a formed in the forward face 25a of the piston, instead of the radial grooves 26 formed in the rear face of the sealing disc as in Fig. 1.

The construction and functioning of the devices of Figs. 1 and 6, except for the changes noted, is substantially the same.

Fig. 9 illustrates a plurality of measuring devices embodied in a single main structure 1b. The inlet chambers B1, B1 of the several measuring mechanisms are fed with lubricant under pressure, through a common inlet passage 18b extending from end to end of the body 1b and provided with a feed pipe 19b which is connected to the source of supply of the lubricant under pressure, the second end of the common passage 18b being closed in any suitable manner as by a plug 41. The operation of the multiple mechanism shown in Fig. 9 is substantially the same as that described with respect to the mechanism shown in Figs. 1 and 2, the several pistons operating in unison and simultaneously expelling lubricant under pressure from the several measuring chambers A1, A1, into the pipes 35b, 35b leading to the several different parts of the mechanical apparatus being lubricated.

I claim:

1. A measuring device for pressure lubricating systems, comprising a cylinder, a piston reciprocable axially in said cylinder, a piston rod extending from the rear face of the piston to the atmosphere outside the cylinder through a packing gland in one end of the cylinder, an inlet for lubricant to the cylinder between said gland and said rear face of the piston, a discharge port for the lubricant in the opposite end of the cylinder, a sealing disc in the cylinder between said discharge port and the forward face of the piston, a spring normally holding said disc against the forward face of the piston, and by-passes within the cylinder for displacement of the lubricant past the piston and the sealing disc.

2. A measuring device for pressure lubricating systems, comprising a cylinder, a piston reciprocable axially in said cylinder, a piston rod extending from the rear face of the piston to the atmosphere outside the cylinder through a packing gland in one end of the cylinder, an inlet for lubricant to the cylinder between said gland and said rear face of the piston, a discharge port for the lubricant in the opposite end of the cylinder, a sealing disc in the cylinder between said discharge port and the forward face of the piston for closing said port upon predetermined forward movement of said piston, resilient means for unseating said disc from its port closing position upon predetermined reverse movement of said piston, and by-passes within the cylinder for displacement of the lubricant past the piston and the sealing disc.

PERCY P. TEAL.